(12) United States Patent
Butte (10) Patent No.: US 10,196,595 B2
(45) Date of Patent: Feb. 5, 2019

(54) ACCELERATED AGING OF ALCOHOL DRINKS

(71) Applicant: Bryan Butte, Seattle, WA (US)

(72) Inventor: Bryan Butte, Seattle, WA (US)

(*) Notice: Subject to any disclaimer, the term of this patent is extended or adjusted under 35 U.S.C. 154(b) by 240 days.

(21) Appl. No.: 15/094,955

(22) Filed: Apr. 8, 2016

(65) Prior Publication Data

US 2017/0292100 A1 Oct. 12, 2017

(51) Int. Cl.
*C12G 3/06* (2006.01)
*B01D 35/00* (2006.01)
*C12C 3/08* (2006.01)
*C12G 3/07* (2006.01)
*C12H 1/22* (2006.01)

(52) U.S. Cl.
CPC .............. *C12G 3/065* (2013.01); *C12H 1/22* (2013.01)

(58) Field of Classification Search
CPC ............. C12G 3/065; C12G 3/06; C12H 1/22
USPC .... 99/277.1, 277.2, 276; 426/422, 124, 398, 426/592, 8, 495, 11, 112; 429/11, 8, 62, 429/112, 115, 495; 210/85, 86, 87, 96.1, 210/103, 104, 143, 202, 205, 219, 248, 210/194, 743, 744, 257.1, 195.1, 258, 210/259; 366/134, 136, 142, 184; 137/93, 389, 391, 393, 590.5; 422/62, 422/110, 111, 105, 107, 114, 132
See application file for complete search history.

(56) References Cited

U.S. PATENT DOCUMENTS

| 2,653,092 A | 4/1951 | Renier |
| 4,558,639 A | 12/1985 | Hojnoski |
| 6,745,592 B1* | 6/2004 | Edrington ............ A23G 9/045 426/524 |
| 6,869,630 B2 | 3/2005 | Gross, II et al. |
| 7,063,867 B2* | 6/2006 | Tyler, III ............... C12H 1/16 426/237 |
| 7,357,069 B1* | 4/2008 | Karasch ................ C12G 3/065 99/277.1 |
| 8,216,623 B2 | 7/2012 | Anand et al. |
| 8,381,926 B2 | 2/2013 | Kenealy et al. |
| 8,586,117 B2 | 11/2013 | Vastardis et al. |
| 8,689,678 B2 | 4/2014 | Eustis |

(Continued)

OTHER PUBLICATIONS

John D. E. Jeffery, Aging of Spirits in Barrels of Non-Traditional Volume, Thesis, Michigan State University, Food Science, 2012.

*Primary Examiner* — Dana Ross
*Assistant Examiner* — Ket D Dang
(74) *Attorney, Agent, or Firm* — Mark Wisnosky (57) ABSTRACT

Devices and methods are described that enable controlled, repeatable and accelerated aging and infusion of alcohol containing beverages. The devices include newly reaction canisters in a computer controlled environment of valves, pumps, interconnecting plumbing, sensors and mixing and dispersing manifolds. Embodiments include devices and infusing materials. The infusing materials include traditional aging/infusing materials such as oaks traditionally used to make barrels for aging and infusion as well as other woods and a variety of non-wood infusion materials such as citrus, beans and seeds. The combination of controls, sensor and computer interface allows for repeatable preparation of aged/infused drinks and for development of new aged/infused drinks.

15 Claims, 9 Drawing Sheets

(56) References Cited

U.S. PATENT DOCUMENTS

| | | | |
|---|---|---|---|
| 2001/0018086 A1* | 8/2001 | Gross, II | C12G 3/06 426/132 |
| 2005/0048186 A1 | 3/2005 | Lehmberg et al. | |
| 2005/0123658 A1 | 6/2005 | Tyler, III et al. | |
| 2010/0092636 A1 | 4/2010 | Watson et al. | |
| 2010/0129490 A1* | 5/2010 | Williams | C12C 11/006 426/11 |
| 2011/0070331 A1 | 3/2011 | Watson et al. | |
| 2011/0129589 A1 | 6/2011 | Watson et al. | |
| 2011/0143000 A1 | 6/2011 | Fiset | |
| 2012/0164300 A1* | 6/2012 | Niazi | C12G 3/065 426/592 |
| 2013/0029016 A1* | 1/2013 | Gottenbos | C25B 1/003 426/244 |
| 2013/0149423 A1 | 6/2013 | Lix | |
| 2015/0017297 A1 | 1/2015 | Vastardis et al. | |
| 2015/0247110 A1 | 9/2015 | Dale | |

* cited by examiner

ACCELERATED AGING OF ALCOHOL DRINKS

CROSS-REFERENCE TO RELATED APPLICATIONS

Not Applicable.

BACKGROUND OF THE INVENTION

Technical Field

The present invention relates to devices for enhancing the flavor of alcohol containing drinks through accelerated aging and infusion.

Related Background Art

Alcohol containing drinks such as whisky, bourbon, rum, wine, beer and others are all well known to have improved flavor through aging. The process is applied both to fermented, undistilled, products such as typical beers and wines, and to distilled products such as whisky, bourbon, rum, etc. All of the products are made by fermentation of a sugar or other carbohydrate containing material that can be digested through use of a yeast to produce alcohol. In some cases, the fermented product is then immediately ready for consumption, but can be improved through aging. In other cases, the raw fermentation product is distilled to increase the alcohol content and the distillate is then aged. The process typically takes place in pre-treated oak barrels and can take anywhere from weeks to years. Both distilled and non-distilled products are starting points for the aging process. For the purposes of this patent application both distilled and non-distilled product prior to aging are called raw product and after the aging process are referred to as aged product.

A significant portion of the cost and risk in making such alcohol drinks is in the aging process. The aging process lengthens the production cycle to years and can severely limit production capacity. The long aging process also makes it nearly impossible to provide experiments with new aging processes including materials as the experiments may take years to get results. Additionally, the long aging process interjects uncertainty into the business as the investment in making a product today may not pay off for years.

There have been numerous studies on the chemical and physical changes that occur during the aging process and attempts to accelerate the process. It is known that material is both removed and added to the raw product. Additionally, it is known that there are chemical changes beyond simple addition and subtraction of chemical moieties. Despite the amount of study, there is still no known process that will accelerate the aging process and produce and aged product that tastes the same as products aged traditionally over periods of years. There is still a need to control the known and as yet discovered aging parameters in such a way as to accelerate aging to produce an equivalent product. The invention however addresses not only accelerating the process to produce the traditionally aged/flavored alcoholic drinks but also to provide a means to investigate and develop new flavors through controlled aging processes that can use new materials and control the process.

The aging process is almost universally done through contact with a wood product, typically Oak in the form of Oaken barrels. Although it is known that there is "aging", when the raw product is in contact with a variety of woods including different varieties of oak as well as different species of wood materials, the barrels used in for currently known aging are made from materials selected on the basis of both the flavor enhancement achieved as well as the more esoteric requirement that the barrels not leak. Not all woods varieties can be made into leak-free barrels even though they may enhance the flavor of a raw product. Hemicellulose, tannin, lactone, and lignin, are four compounds in wood containing subtle and desirable chemicals necessary to age distillate. Traditional barrel aging extracts these in about 3 to 16 years. These barrels besides being slow to release their attribute burden are limited in the range of aromatics, flavors, and colors that are released and in the taste, smell, color and mouthfeel that results. Traditional aging uses 3 species of oak, America white oak (*Quercus alba*), English oak (*Quercus petraea*), and European (*Quercus robur*). The other 600 or so oaks aren't used because they leak so much that at the end of the traditional aging process no distillate is left in the barrel. But this doesn't mean their flavor attributes are lacking. For example, the US has about 80 species of pretty big oak of which about 97% aren't used in ageing. Mexico has 127 species of really small oak of which none is used.

In some cases, the Barrels are toasted prior to use in aging and in other cases the interior of the barrels are charred prior to use in aging. In some cases, the barrels are used just once and in other cases the barrels are used a second or even more times. There are cases where barrels used for aging of one type of product, Wine for example, are then used subsequently for aging a distilled spirit. The interactions in the aging process are not just between the wooden barrel and the raw product. In some cases, the wood for making the barrels is first aged and it is known that there is fungal growth in the wood during this aging process. It is also known that the aging process includes some loss of the raw product. The aging process is usually not in a controlled environment. There is some speculation that a partial reason for the long term of the aging process is that the raw product in the barrel as it ages must go through several seasonal variations of temperature and humidity. There has also been some limited success using other means to accelerate the aging process. Using smaller barrels or otherwise increasing the surface area of the wood in contact with the raw product has had limited success in accelerating the aging process. Others have used ultrasonic in the form of applying ultrasonic energy to the barrel and the contents during aging.

The barrels although built to minimize losses are not hermetically sealed. Some of the chemical changes during the aging process indicate interaction with oxygen from the air.

The aging process is complex. There are multiple factors both physical, chemical and biological that are involved in the aging process. Since there are so many parameters consistency is difficult. Trying to study, let alone accelerate such a process is a daunting task. Heretofore there has been no system to control the multitude of known variables to study let alone to accelerate the aging process. A system is needed that provides a measure of control over all of the known and perhaps yet to be discovered parameters involved in the accelerated aging of raw alcohol drink products. There is a need for a system that provides accelerated aging of raw alcohol drink products that is fast, repeatable and can be varied to prepare new aging recipes where the variations do not take years to see a result. There is a need for an aging process that enables control over the known variables of temperature, temperature cycling, oxygen, loss to evaporation and other as yet to be discovered process parameters.

DISCLOSURE OF THE INVENTION

The present invention provides a controlled and accelerated apparatus and method for the accelerated aging of raw alcohol drink products. In one embodiment a circulation system is used that cycles temperature, pressure, flow and materials that are contacted the raw product in a computer controlled environment. One embodiment includes a reaction vessel/canister that is specifically designed for controlled interaction of the raw product and a selection of wood products. The wood products may be selected as those that simulate the inside walls contacted by the raw product during the traditional slow barrel aging process. In another embodiment nontraditional wood products that are not amendable to forming a sealed aging barrel, but do impart desirable flavors can be used. The canister therefore allows for new aging recipes for raw alcohol containing drink products. In one embodiment the reaction canister is designed to use specially cut disks of wood material. In another embodiment the reaction canister uses a basket insert that can accept granular or loose chipped material for reaction with the distillate. In one embodiment three separate circulation processes are used for the extraction, filtering and reactions that take place during aging. Computer controlled pumps and valves are used to circulates the raw product through the reaction vessel in a loop until ageing is complete. In another embodiment the pumps and valves are used to pulses the distillate through a bed of wood product, repeating this flow pattern until aging is complete. In another embodiment a slow variation of pressure is used. The invented reaction vessel and computer controlled pump and valve system enables a repeatable time, temperature, pressure and material recipe to be used in a controlled and accelerated aging process.

In a first embodiment, the distillate is passed numerous times through an invented reaction canister that simulates aging within a barrel. In one embodiment the reaction canisters are constructed to simulate the interior of a traditional barrel. In another embodiment traditional barrels are used as reaction canisters. In one embodiment the reaction canisters are digitally keyed such that the computer control system can ascertain that the particular canister being used is appropriate for the particular recipe of aged alcohol containing drink being produced. The parameters of temperature, pressure and flow are controlled as the raw product is passed through the reaction canister. In one embodiment, the raw product is subject to an evaporative process to simulate and accelerate the known loss (known as the angel's share) of the aging drink product during traditional slow barrel aging. Both heating and cooling of the raw product when in contact with wood products in the reaction vessel expansion and contraction of the saturated medium releasing the natural flavoring components into the distillate. The circulation, heating, cooling, pumps, oxygenation, irradiation and instrumentation are all controlled by a computer system(s) and provide both well controlled, repeatable as well as accelerated aging of the distillate. In the preferred embodiment all the pumps, valves, heaters, coolers, oxygenation, irradiation and test instruments are networked to a single computer system. The computer system controls all operating parameters in the form of a stored program or recipe for the aging. A plurality of recipes can be stored in the computer system for producing a plurality of flavored alcohol drink products.

Another embodiment includes reaction canisters that move the distillate through medium disks or medium ground caked cylinders under pressure. Medium disks or medium ground caked cylinders are used for dispensing through an infuser at a home or point of sale. Medium disks are compressed to infuse and extract the concentrate. The dispenser moves distillate either by hand pump, mechanical pump or compressed air. The reaction canisters may be replaceable or in another embodiment the reaction canister is rechargeable with a flavor disk. In the preferred embodiment the flavor disk is a compressed wood disk.

Another embodiment includes a recipe for a computer controlled accelerated aging process for an alcohol containing drink. Non-limiting exemplary parameters included in the recipe are the materials used in the reaction canisters, the temperature of individual canisters, the flow rate throw the canisters, the pressure and temperature in the reaction canisters, parameters for a pump out module that removes a portion of the volatiles of the aging alcohol containing drink, parameters for an oxygen infusion module including amount of oxygen or air to infuse into the aging distillate and for UV irradiation of the distillate. Further parameters included in the recipe are the measured parameters for the distillate during the aging process. Measured parameters include, but are not limited to, temperature, pressure, alcohol content, color including UV-Vis-NIR spectral analysis, concentration of other particular components such as aldehydes and ketones. In another embodiment the measured parameters include analysis for at least one of furfural, 5-methyl-furfural, vanillin, guaiacol, 4-methyl-guaiacol, eugenol, and, cis and trans oak lactone, and syringaldehyde

MODES FOR CARRYING OUT THE INVENTION

Figure 1:
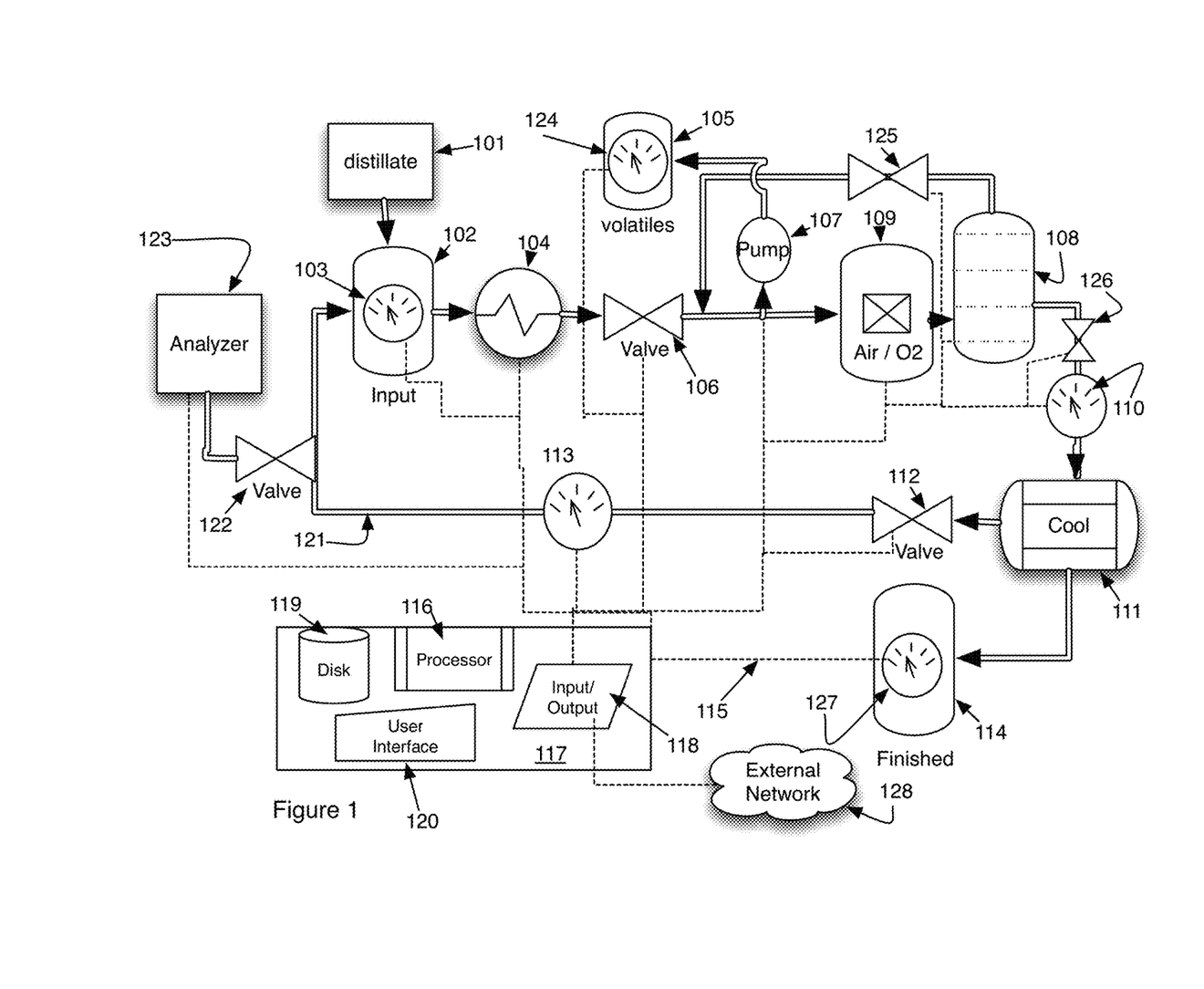
FIG. 1 is a block diagram showing hardware used to practice the invention.

Referring to FIG. 1, a block diagram for components included in various embodiments of the invention are shown. Not all embodiments include all of the components shown and many embodiments include either more components discussed below or a plurality of the individual elements shown in FIG. 1. The process begins with an entry point 101 to the reactor system. It is here that distillate is introduced into the system. Other chemical components may also be introduced into the system at this point. In one embodiment the system may be cleansed and/or recharged by introduction of fluids that remove contamination from a prior batch aging procedure. In another embodiment fluids are introduced that pre-treat components held in reaction canisters. Pre-treatment includes extraction of wood products held within reaction canisters. After the pre-treatment the pre-treatment chemicals may be pumped out of the system prior to introduction of the raw alcohol containing drink that is to be aged. In a preferred embodiment the entry consists of a gateway including at least two valves (not shown) wherein opening a first valve allows introduction of distillate or unaged alcohol containing drink fluid into a holding chamber. The first valve is closed and a second valve is opened to allow introduction of the raw fluid into the reactor 102. In this manner fluid can be introduced into the system and maintain isolation of the system from the atmosphere. In one embodiment the first reactor 102 is a reaction canister described in detail in FIG. 3 and the associated discussion. The Reaction canister includes wood material contained in its interior used for interaction with the raw fluid during the aging process. In another embodiment the first reactor 102 is a traditional oak barrel used in the aging process that has been further fit with entry and exit connections. The reaction canister 102 includes sensor 103 to indicate a state of the fluid within the reactor. Non-limiting exemplary sensors include those to measure temperature, pressure, color, total volume of fluid. In another embodiment the first canister 102 is a holding tank to allow for adjustment of flow and pressure within the invented system and for containing a variety of measurement devices 103. Non-limiting measurement devices 103 include temperature, pressure, uv-visible spectral analysis, infrared and near infrared analysis. The canister is connected by plumbing 121 to other components in the system. The sensor 103 is connected, either wired 115 or wirelessly, to an input/output port of a computing device 117. The computing device is programmed to take an action based upon the output of the sensor 103. Actions include opening and closing valves, starting and stopping pumps turning on or turning off air/Oxygen infusion devices 109. The flow from the reactor 103 is controlled by a pump 104 and a valve 106 included in the plumbing line that pumps the fluid through the reactor and from the reactor to other devices in the invented system. The pump and valve are also electronically connected through a network 115 to the computing device 117 such that the computing device may be programmed to turn the pump 104 on and off and to open and close the valve 106. The raw fluid may be held within the reaction canister 102 for a pre-selected period of time or may be pumped through the reaction canister 104 at a preselected pressure, fluid flow and temperature. In another embodiment the raw fluid is held within the reaction canister for a period of time until the sensor 103 achieves a pre-selected reading. In another embodiment there are a plurality of reaction canisters 102 with a plurality of pumps 104 and valves 106 each connected to and controlled by the computing device 117 such that invented aging process may include interaction with a plurality of different materials under a plurality of conditions. The plurality of different materials includes a plurality of different wood products. As a nonlimiting example a series of canisters may contain a variety of different oak products. In another embodiment a series of canisters contains a variety of oak products that have been subjected to differing pretreatments. Pretreatments include aging, roasting, charring, and chemical extractions.

In another embodiment the canisters include inserts or baskets containing filtering products such as charcoal filtering, specific chemical species filtering and particulate filtering. Once activated by the computing device 117 the pump 104 is turned on and the valve 106 is opened and the aging raw fluid is pumped through the interconnecting piping 121 to additional components in the accelerated aging system. An additional component includes a vacuum pump 107, also connected to and controlled by the computing device wherein when activated the vacuum pump subjects the fluid within the plumbing of the system to a partial vacuum to remove more volatile components from the main portion of the plumbing into a volatiles condenser 105. This allows for a control program to include remove of a portion of the raw distillate exemplified in traditional aging variously referred to as the Angel's cut. The condenser 105 further includes sensors 124 that is connected wired or wirelessly to the computing device 117 and sends a signal of the sensor response to the computing device. The sensor 124 includes reporting the amount of material collected as a condensate. In another embodiment the sensor includes the chemical composition of the condensate collected. In another embodiment the computing device 117 is programmed to actuate valve 106 and vacuum pump 107 to turn on if the amount of condensate detected by the sensor 124 is less than a preselected value and turn vacuum pump 107 off if the amount of condensate is greater than a preselected amount. In another embodiment the valve 106 and vacuum pump 107 are turned off on the basis of preselected times in a timed program to age the raw fluid.

Another embodiment further includes an air/oxygen sparge tank 109. It is known that in the normal long term aging process oxidation reaction take place through oxygen infusion through the walls of the barrel. An infuse can use either oxygen or air to accelerate the oxidation process in this invented accelerated process. The oxygen infuser 109 would further include an electronic controlled valve networked to the computing device that turns the infusing flow of air/$O_2$ on and off based upon a preselected timed process or a measurement of a property of the raw fluid being aged. Measurement can include measurement of oxygen content of the fluid through either element analysis or through spectroscopic means or polarimetric measurements of oxidation state on the fluid. The sensor is either incorporated within the infuser 109 itself or incorporated externally to the infuser such as sensor 110. Flow from the infuser proceeds to a reaction canister 108. This second reaction canister can be used as a buffering region to maintain flow and control volume through the system or for installation of additional sensors. In one embodiment the canister 108 is as is described in FIG. 3 below. In another embodiment the canister 108 is a holding tank and mounting location for sensors. Flow out of is controlled by valves 125, 126. In one embodiment the valves are on/off solenoid actuated valves, both controlled through a networked connection to the computing device 117. In another embodiment, one or both of the valves 125, 126 are adjustable flow valves such that the setting of the valves can control a proportioned flow where a portion of the flow proceeds towards sensor 110 and a portion of the flow is looped back and goes through the region of the vacuum pump 107 and air/oxygen infuser 109. In such a manner a portion of the flow can continue through the vacuum and infusion process while the bulk of the flow continues on to sensor 110. Sensor 110 is used to determine the amount of flow that should be proportioned through the above discussed loop and what proportion should move on through the cycle. Sensor 110 can also be used to control a heating/cooling unit 111. In one embodiment the sensor 110 is a thermistor and the output of the thermistor is routed through the network to the computing device where the temperature is used as feedback control to control the settings of the heating/cooling unit 111. Any of the sensors 103, 110, 113 and the analyzer either alone or in combination may be used to determine if conditions of the fluid have reached a point for withdrawing fluid from the system.

Signals used for determining conditions for completion include chemical analysis for the species already mentioned, UV-Visible spectra to look for either coloration or particular species or the termination may be determined not by a preselected parameter sensed but rather on the basis of time. If it is determined the aging process is complete some or all of the fluid is diverted through the cooling unit 111 to the finished unit 114. The finished unit may further include sensors 127 that are used to determine the state of the aged fluid. In one embodiment the state of the fluid is used to determine the need for blending of the aged fluid from the loop shown with fluid that has passed through a separate aging process. In one embodiment the sensor 127 is used to determine the proportion of the present fluid that should be blended with other fluids. The system includes a valve 112 that controls diversion of the fluid to either the finished tank 114 or to continue through the interconnected plumbing to loop back to the beginning of the process 102. Another embodiment further includes a sampling valve 122. The valve is used, under control of the processor 117, to take samples form the flowing stream within the loop 121 and divert the sample to an analyzer 123. The analyzer is used for analysis that cannot be accomplished in an inline sensor such as sensors 110, 113 and others already discussed. Nonlimiting examples of analyzers 123 include gas chromatographs (GC), gas chromatography mass spectroscopy (GC-MS), liquid chromatography with a variety of UV, VIS and mass spectroscopy detectors, and infrared and near infrared spectrometers. In another embodiment the analyzer is a combination of more than one of the analyzers listed. The analyzer may be used to follow composition and color changes as the fluid is looped through the aging device and provide a signal that the aging process is complete. Signal that the process is complete may be a combination of compositional and color signals. In another embodiment the results of the analyzer, ported to the computing device 117 are used programmatically to control any of the valves and devices shown in the FIG. 1 and already discussed.

The computing device 117 is comprised of a processor 116, a user interface to allow input of commands and programs, a storage unit 119 that can store programs in the form of recipes to control the valves and pumps as discussed above, and a input/output unit that includes both input for analog signals through an analog to digital converter as well as digital signals from sensors and analyzers that send data in the form of digital data and both analog and digital control signals to control valves, heaters, coolers and air/oxygen infusers as discussed above. The input/output port may also be used for external communication to other devices through an External Network 128 such as a local area network and the Internet.

Figure 2:
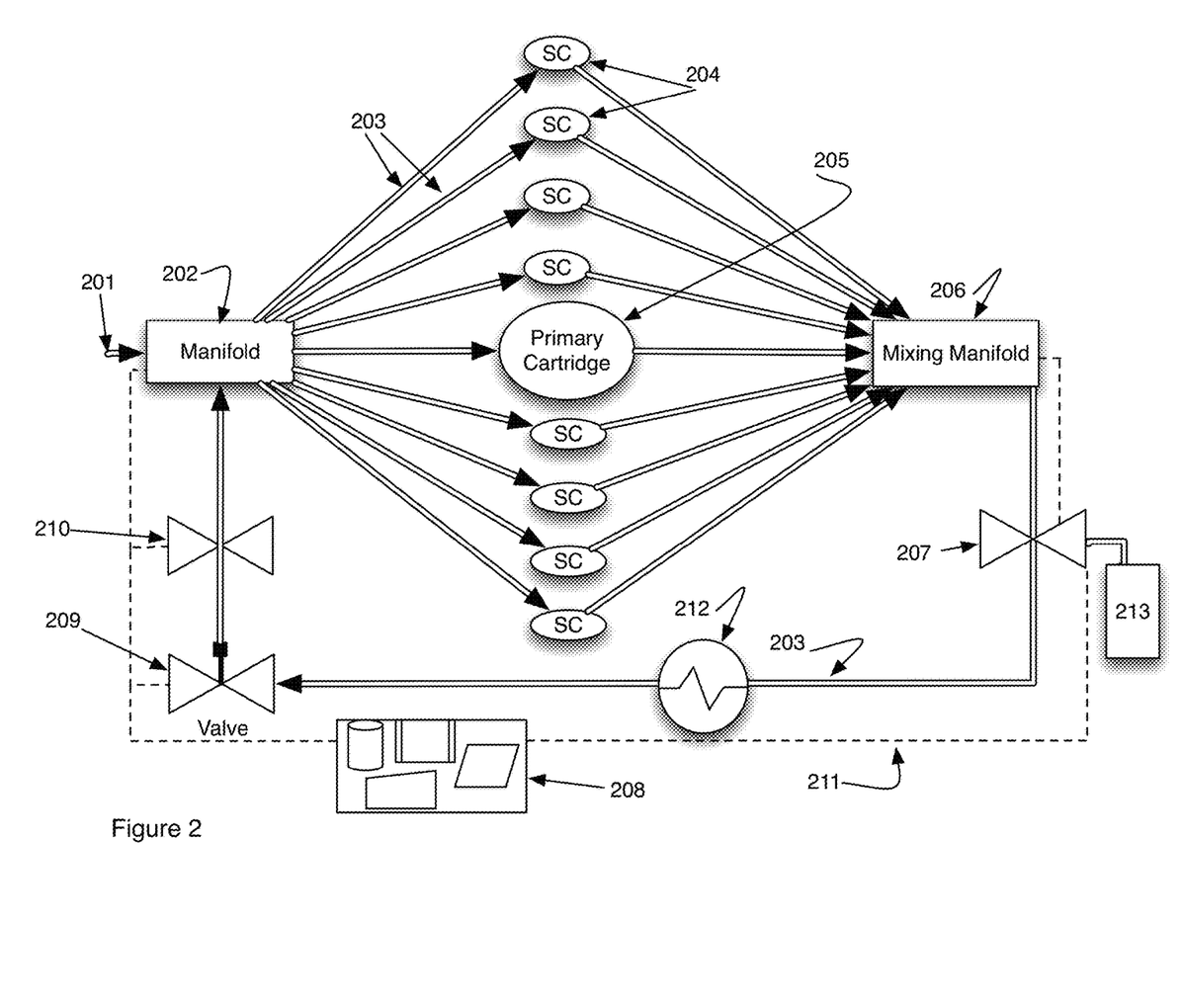
FIG. 2 is a block diagram of a system using multiple instances of the hardware of FIG. 1.

In another embodiment shown in FIG. 2 a fluid aging system includes a plurality of reactors 204 are included in a multiple branch looped manifold 203. The system includes an input port 201 used for introduction of raw unaged fluid into the system. In one embodiment the import port 201 is the same as that described in conjunction of the system of FIG. 1 and includes paired valves and an input canister that allow introduction of fluid into the system without exposing the interior of the manifold to air and without losing any fluid already introduced into the system. As in FIG. 1 the manifold of FIG. 2 includes a plurality of pumps 212 and valves 207, 209, 210 and distribution manifolds 202, 206 that are all in communication through a wired or wireless network 211 to a computing device. The computing device is programmed to control the flow through the system through controlling how the fluid is proportioned to each reactor 204. In one embodiment each of the reactors 204 represent a single reactor/infusion canister as shown in more detail in FIG. 3. Each of the reactors 204 may contain the same materials thereby increasing the reacting surface area of the system or each of the reactors may contain different reactor components. In one embodiment the different reactor components include wood products from different species of woods. In another embodiment the different reactors 204 include different species of woods that have been pre-treated by different methods. Non-limiting pretreatment methods include aging of the wood, toasting of the wood, charring of the wood, physical degradation of the wood and chemical degradation of the wood. Thus one reactor of the plurality of canisters may include charred wood product and a plurality of the other canisters 204 may include a toasted wood product. In another embodiment there is further included a primary cartridge 205. In a preferred embodiment the primary cartridge accepts the bulk of the flow in the looped system and the flow proportioned through the array of other reactors 204 is based upon either a pre-programmed recipe based upon time and flow or based upon sensors or analyzers (not shown, but analogous to those in FIG. 1) that provide sensor data to the computing device 208 which then proportions flow through each of the reactors 204, 205 based upon analysis results. Flow out of the reactors 204 is mixed into a single stream 206 and then flows through control valves 207, pump 212, flow control valve 209 and control valve 210. Once the aging process is complete as determined by either a preselected time and flow recipe or by results from analysis of the fluid within the system the valve 207 is actuated to diver flow out of the system and into a collector vessel 213.

In one embodiment each of the reactors 204 is a reactor canister as shown and discussed in FIG. 3 below. In another embodiment each of the reactors are reactor systems equivalent to that shown in FIG. 1 and may themselves include a loop system with pumps and valves and a plurality of reactors. The computing device 208 is then a primary computing device interfaced to each of the computing devices 117 of FIG. 1 providing control for each reactor and for control of the amount of fluid diverted to each of the reactor systems 204. The primary computing device 208 is further programmed control the mixing manifold to mix portions of the outflow from each of the individual plurality of infusion devices 204 in a proportion that is determined either by a signal from a chemical composition sensor or on the basis of the signals form the chemical composition sensors in each of the systems 204 or on the basis of a predetermined recipe held in memory of the primary computing device.

Figure 3:
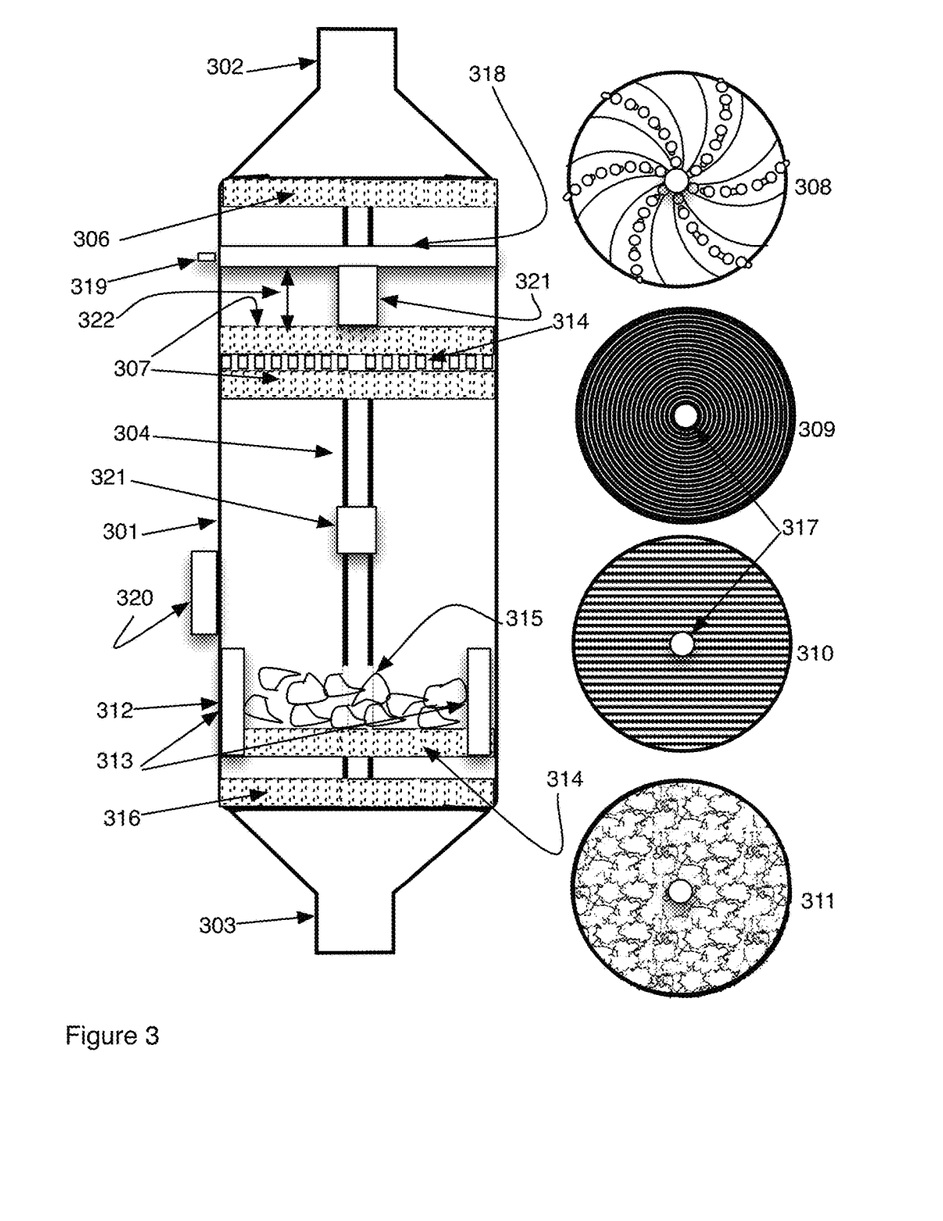
FIG. 3 is a cross-section view of a first embodiment an infusion/reaction cartridge used in the hardware of FIGS. 1 and 2.

FIG. 3 shows the details of individual reactor canisters as used in the system of both FIGS. 1 and 2. The reactor 301 is shown in a cross-sectional view. The reactor 301 is a cylinder that includes an entrance 302 and an exit 303. The entrance and exit are fit with connectors that may be connected to pipe or tubing to allow pumping of the fluid to be aged through the canister under controlled conditions of pressure, flow, temperature, etc. The interior in the embodiment shown includes a central shaft 304 that is used to align and support disks 307-311 through which the fluid flows during the aging process. The first disk and disks interspersed throughout the cylinder include a disk 308 drilled to disperse the fluid evenly over the top surface of the disks within the cylinder. Other disks include wooden disks that cut wither across the grain 309 or with the grain 310. The cutting enhances interaction of the fluid with the disks for extraction of materials from the solid wood disks. The disks further include disks 311 that are made of compressed particulate materials. The disks can be made from any of a variety of woods including oaks commonly used for aging of alcohol containing drinks to woods that are not yet used for the aging process but are known to impart a flavor to alcohol containing drinks. The compressed particulate disk 311 may include wood particles, citrus fruit, flowers, juniper, coffee, cacao beans and other flavor enhancing components currently used and yet to be discovered. The disks within an individual canister may be made from a single material and multiple canisters are used in the aging process and the fluid flow through individual flavoring canisters can then be blended to produce the desired end product. The fluid control system described in FIGS. 1 and 2 enable the temperature, pressure and amount of flow through individual canisters to be controlled through a computing device such that the flavor achieved through the invented accelerated aging process is reproducible. Individual disks are cut in a circular shape to fit the interior cross-section of the reaction canister 301 and include a centrally located hole 317 sized and positioned to fit over the central alignment shaft 304. Although shown as a cylindrical reaction canister other shapes will also work. Other embodiments (not shown) include triangular, rectangular and other polygonal shapes. In other embodiments a plurality of shafts 304 are used to support the disk inserts with the disks drilled with a plurality of holes sized and located to align with the support shafts. In other embodiments the shape and size of the disk inserts are selected to match the shape and size of the interior of the reaction canister.

The reaction canister further includes interchangeable cylindrical sleeves or spacers 314 to keep individual disks 307 separated and enhance flow over the disk 307 surface and through the disks. In another embodiment the reaction canister includes a plurality of the interchangeable cylindrical sleeves 321 that have an inside diameter that is larger than the outside diameter of the central shaft 304 such that they may be placed over the central shaft 304. The sleeves are used to position other components that are placed in the reaction canister by placement over the central shaft 304. In one embodiment, the holes 317 in the disks 308-311 are sized such that the diameters of the holes are larger than the outside diameter of the central shaft 304 but smaller than the outside diameter of the sleeves 321 such that when the disks 308-311 and/or other active components 318 are placed alternately with the sleeves 321, the space between the components is maintained at the length of the sleeves 322.

The interior of the canister can further include other active components 318. Exemplary active components include heaters, coolers, air infusion disks and sensors. Sensors include pressure, temperature, pH, platinum electrodes to indicate oxidation state and optical sensors and other sensors known in the art to be indicative of the chemical composition of the fluid within the canister. The active components further include a connector 319 to the external environment of the canister. The connector may be an electrical connector such as would be used for heaters, coolers and sensors or a plumbing connector that may be used for an infuser or circulating cooling fluid.

In another embodiment, the canister is further fit with a basket 312. The basket is cylindrically shaped including vertical walls 313 and a fitted bottom 314 through which fluid may flow. The basket 312 enable placing of loose material 315 within the basket through which the fluid flows during the aging process. Exemplary loose material includes seeds, beans both crushed and whole, flowers, and fruit and fruit parts such as skins including citrus skins. Although shown singularly, a plurality of baskets 312 may be stacked in the reaction canister 301. The basket includes a centrally located hole (not shown) in the bottom of the basket that allows the basket to be placed over the central shaft 304.

The exit of the canister includes a fritted disk 316 through which the fluid may flow but fines or particulate matter is retained within the reaction canister. In one embodiment the disk 316 at the exit is a porous wooden plug located at the exit port of the reaction canister and positioned such that the raw fluid must pass through the porous wooden plug as it exits the reaction canister.

In another embodiment the canister also includes an identification means 320. In a preferred embodiment the identification means is an electronic memory device connected to the computing device of FIGS. 1 and 2 that can uniquely identify the particular canister. In this manner a system setup can be certain that a particular type canister is included in the system. In another embodiment the identification means is readable by a sensor that is in electronic communication with the computing devices. Such sensors include an RFID tag, a bar code and a key mechanical interface that trips a particular set of switches when the canister is placed in position for use. The electronic sensor in conjunction with the computing device also allows for tracking as to whether a particular canister has been used in an aging process and how much fluid has flowed through the canister thereby signaling a need for recharging the canister after a pre-selected flow volume has been measured.

Figure 4:
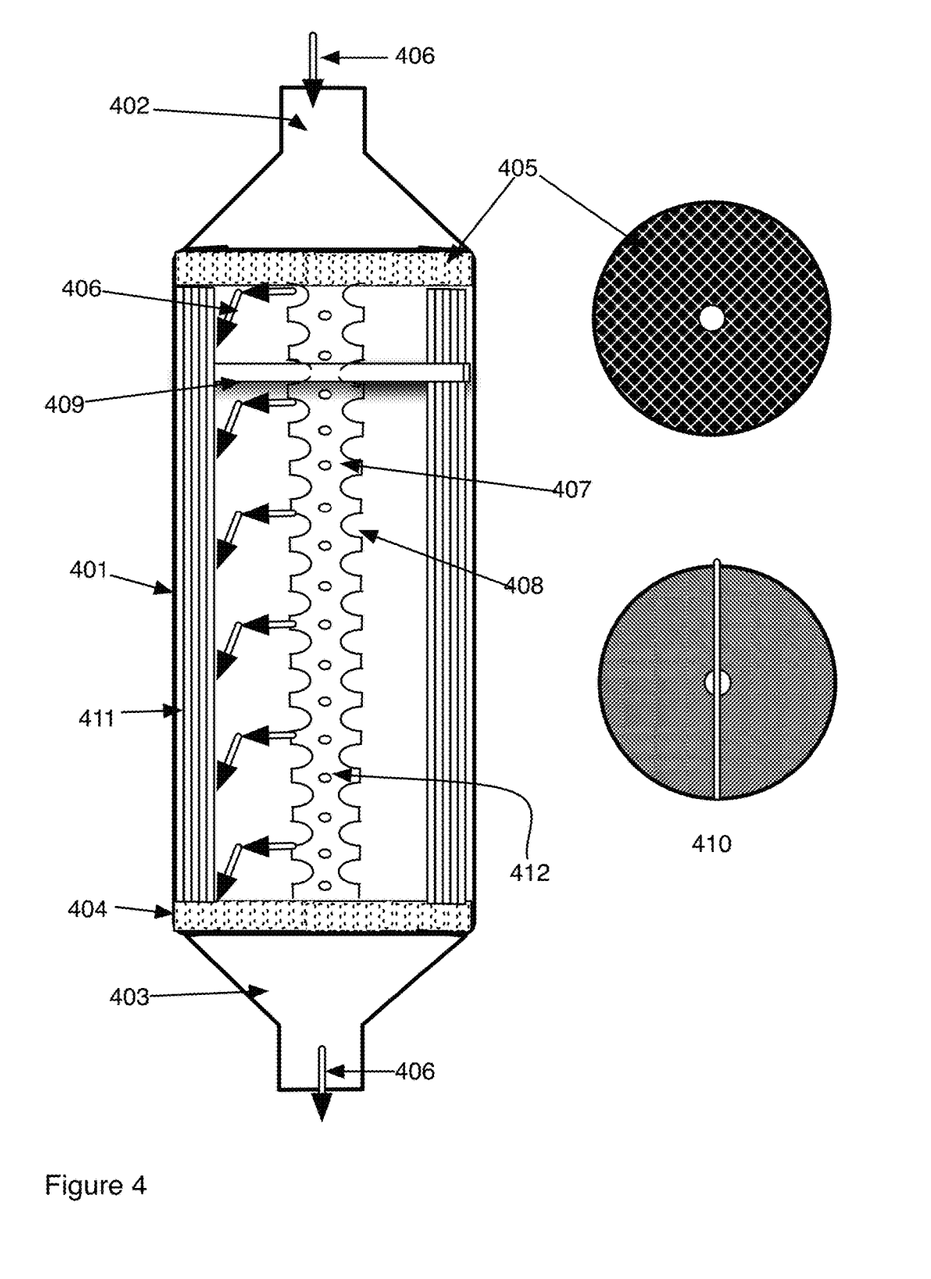
FIG. 4 is a cross-section view of a second embodiment infusion/reaction cartridge used in the hardware of FIGS. 1 and 2.

In another embodiment, shown in FIG. 4, the reaction canister 401, includes an entrance 402 and exit 403 fitting as described in the embodiment of FIG. 3. Disks are fit to the entrance 405 and the exit 404. The disk at the entrance is either a distribution disk as shown in the embodiment of FIG. 3 or may further be a screen mesh 405 as shown in the embodiment of FIG. 4. In one embodiment the disk 404 at the exit is a porous wooden plug located at the exit port of the reaction canister and positioned such that the raw fluid must pass through the porous wooden plug as it exits the reaction canister. The center support 412 in this embodiment includes indentations 408 for holding individual disks 410 in place and holes 407 for distribution of fluid through the reaction canister. Flow is shown with the flow lines 406 to go into the canister and distributed both horizontally and vertically around the disk inserts 409. Removable individual disks 410 are in this case split so that they may fit around the central support rod. The embodiment further includes vertical slats 411. In a preferred embodiment, the vertical slats are cut in the equivalent direction relative to the wood grain as is done in making a stave in a traditional barrel. The flow and interaction with the vertical slats is equivalent to the interaction the fluid would see in a traditional barrel, except that the increased flow accelerates the interaction and thereby accelerates the aging process. Components already discussed including active components, sensors and baskets may similarly be fit to the embodiment shown.

Figure 5:
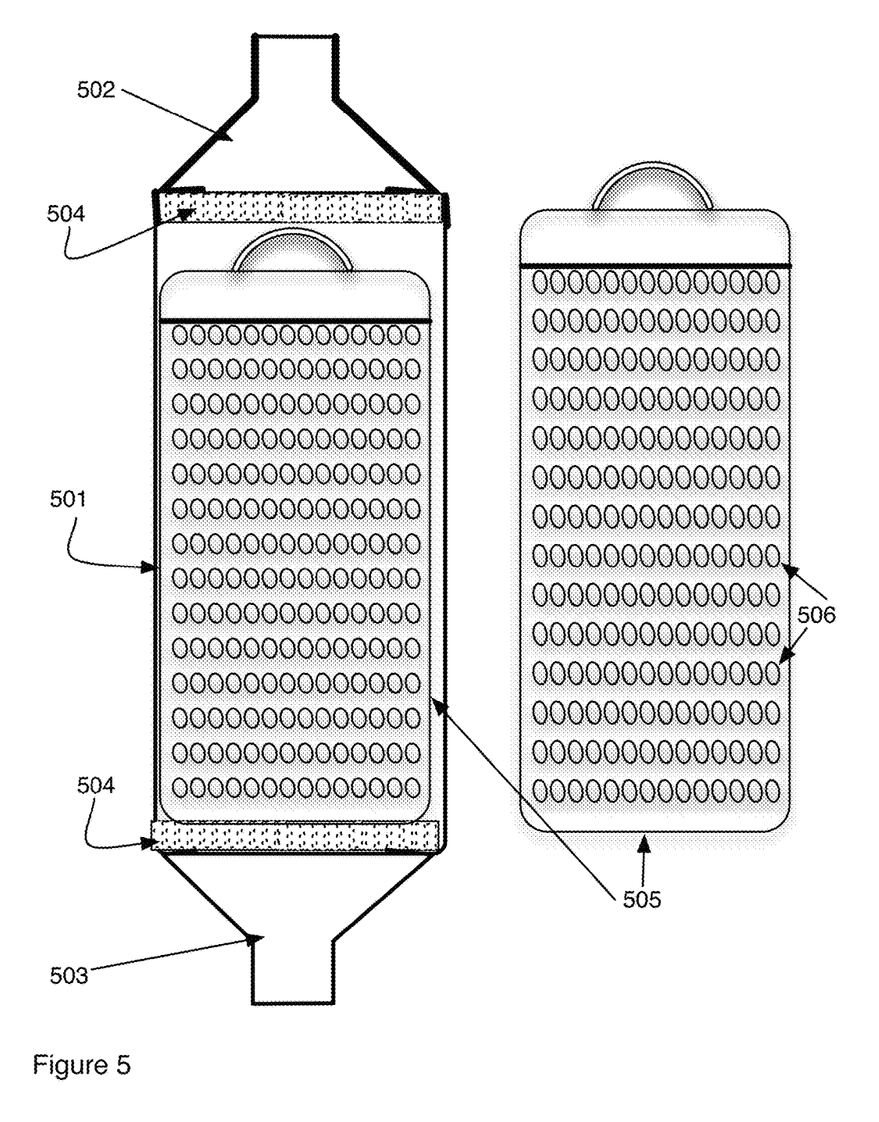
FIG. 5 is a cross-section view of a third embodiment infusion/reaction cartridge used in the hardware of FIGS. 1 and 2.

In another embodiment shown in FIG. 5, the reaction canister 501 is as before a cylinder having entrance 502 and exit 503 plumbing fittings with fritted disks 504 at the entrance and exit of the canister. The entrance 502 of the canister in this embodiment is a screw top that is removable such that a cylindrical basket 505 may be placed into the reaction canister and the cap re-sealed with the basket inside. This embodiment further includes a cylindrical basket 505 that includes a plurality of holes 506 that make the basket porous to flow of the fluid. The basket is loaded with any of the products already discussed, such as wooden disks, wood chips, and non-wood products such as flowers, fruits, beans, etc.

Figure 6:
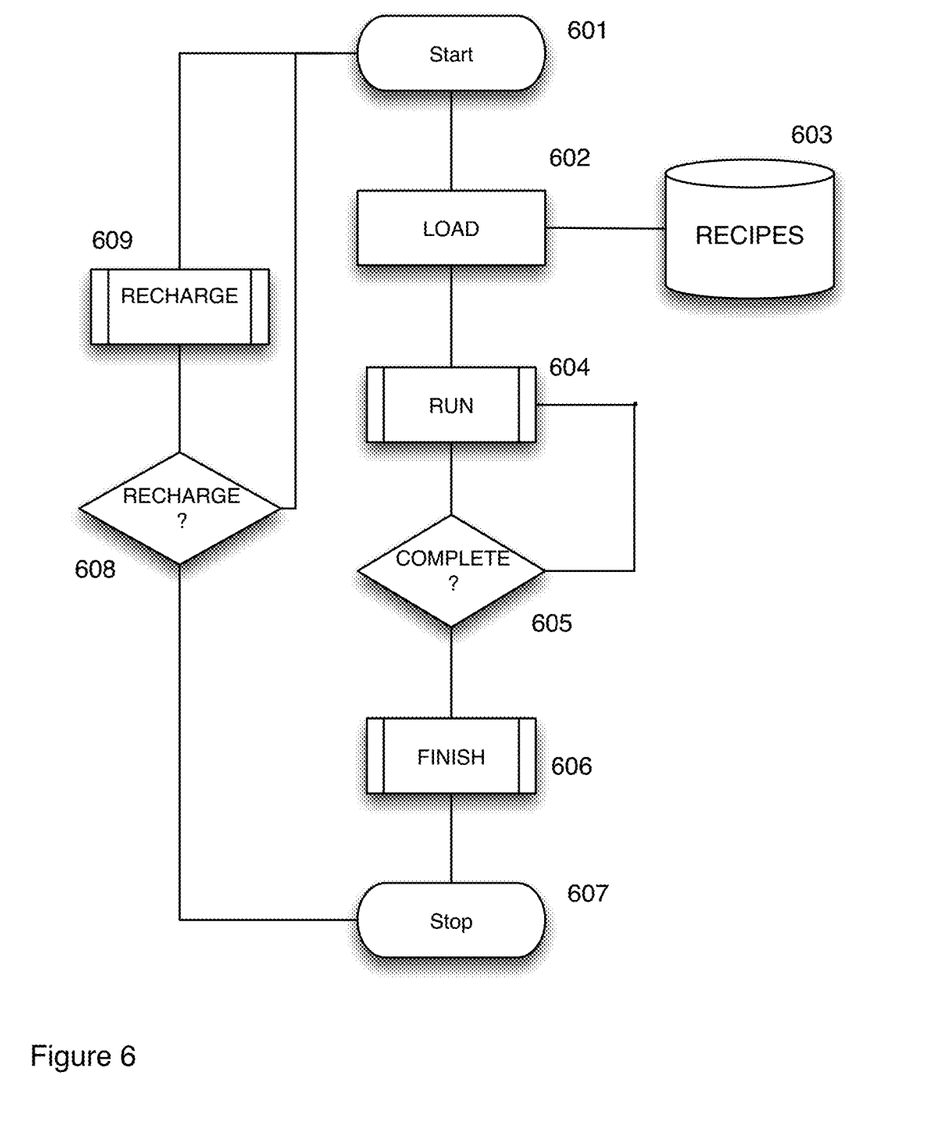
FIG. 6 is a flow chart for a process for using the hardware of FIGS. 1 and 2.

FIG. 6 shows a flow chart for use of the systems described thus far. In a preferred embodiment the computing devices of FIGS. 1 and 2 are programmed to control the valves and other actuators as described to effectuate the flow chart of FIG. 6. The process is initiated 601 either automatically by the computing device or by user input to the computing device. The computing device loads 602 a recipe into the processor memory. The recipe includes sequential steps for actuating valves and pumps to cause the fluid to be aged to be loaded into the system and begin circulating through the reaction canisters and other features of the systems described in FIGS. 1-5. The recipe includes time, temperature and pressure setpoints as well as pre-selected values for the sensors such that actions are initiated if a sensor value exceeds, is equal to or is less than a pre-selected value. Non-limiting exemplary sensor values and actions include circulating of the fluid until a pre-selected optical density is reached, turning the oxygen/air infuser on or off based upon oxidation measurements on the fluid. Oxidation measurements may be done spectroscopically or through electrochemical measurements using embedded platinum electrodes or through chemical analysis for oxidation products. Other actions include controlling the flow, temperature and pressure within the system based upon feedback control using the computing device to control heaters, coolers, pumps and valves. The recipe may also include time and treatment and endpoint values to be achieved where there are a plurality of circulating systems as described in FIGS. 1 and 2 and each of the circulating systems has a particular pre-selected purpose. One of the circulating systems may be for infusion of a particular flavoring, a second may be for controlled oxidation and a third may be for controlled removal through the vacuum pumping of a portion of the distillate. The flow through each of these particular circulating systems is controlled by the computing device depicted in FIG. 2 and the flows from each are blended to a pre-selected proportion. The recipe loaded into memory 602 includes all of the parameters for controlling the individual circulating systems as well as the proportions for blending and the commands used to control the valves in the blending manifold of FIGS. 1 and 2. Loading 602 further includes checking that those apparatuses that are electronically labeled and required for the recipe are in place and have been recharged if necessary. The process then proceeds to run 604 where valves are automatically operated to introduce the raw unaged alcohol containing fluid into the system and pumps and valves are further activated to pump the fluid through the reactor canisters. Run also includes controlling temperature, pressure and flow based upon the feedback sensors included in the system. The system continues running and at the same time testing 605 for completion. In one embodiment testing for completion is testing through the programmed computing device that all processing steps are complete and the elapsed time and flow matches pre-selected values in the loaded recipe. In another embodiment checking for completion 605 further includes checking that values measured by internal sensors and reported to the computing device meet pre-selected values that would be indicative of a completed aging process. Non-limiting values that indicate completion include color of the aging fluid, alcohol content of the aging fluid, and chemical composition of the aging fluid. If completion is indicated the process moves to finishing 606 where the aging fluid is cooled if necessary and valves are actuated to remove the finished product from the system. The aging process is stopped 607 and the computing device then moves to a setup or recharge step 608. In this step a check 608 is made based upon pre-selected parameters as to whether the reaction canisters need to be re-charged in some fashion. Re-charging includes removing and replacing the contents, pumping a cleaning fluid through the canisters, heating steps and pumping fluid through the reaction canisters in a reverse direction. Non-limiting exemplary cleaning fluids include a different alcohol containing fluid or water. If no recharging is required, the cycle moves back to start 601. If recharging is required reaction canisters are re-charged or replaced and then the cycle moves back to start. The requirements for re-charging and the procedures used for re-charging are included in the originally loaded 602 recipes. In another embodiment the requirements for re-charging are encoded into the identification tags of the reaction canisters.

In another embodiment the computing device is programmed to produce not a single infused/aged drink but rather to run a controlled experiment where a multitude of infused/aged drinks may be prepared where the parameters of the experiment includes time, temperature, pressure and infusing materials ("infusates"). The plurality of drinks thus produced may then be subjected to taste tests in a product development scenario. The device in such an experimental product development setting further includes a collection port that can collect into a plurality of vessels to separate the various experimental runs. Such collection systems are known to those skilled in the are and include for example those systems used in a preparative laboratory to collect chromatography fractions.

Figure 7:
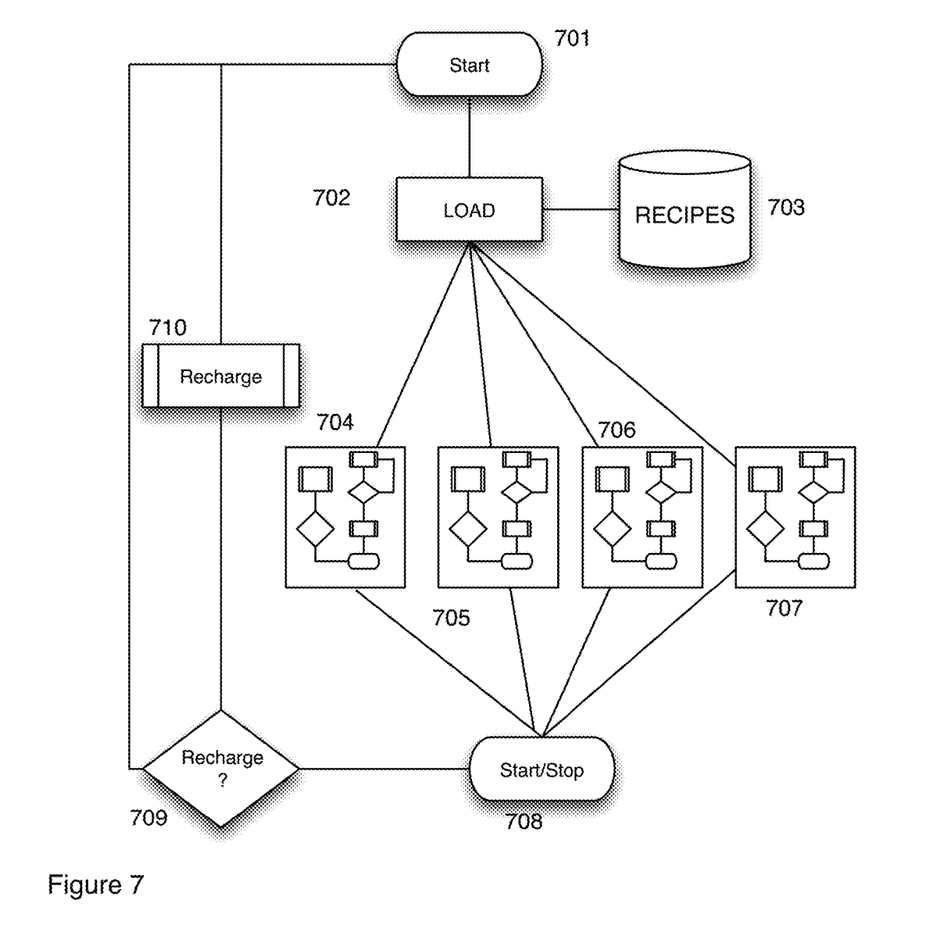
FIG. 7 is a second embodiment of a flow chart for a process for using the hardware of FIGS. 1 and 2.

Previously, in the discussion of FIG. 2, it was shown that each of the reaction canisters in FIG. 2 could in fact be not a single canister but an entire system as shown in FIG. 1. The process flow recipe behaves similarly. Such a multiplexed process is shown in FIG. 7. The process begins 701. This is the starting point of loading a new fluid into the system and is the returning point once the system has completed an accelerated aging process and has been recharged as necessary. The start loads 702 an electronic recipe from electronic data storage 703. The recipe is a set of programming steps that are loaded into the memory of the computing devices that control the system. In the example shown there are a plurality run steps for, one for each of the cycling aging systems 704-707, each as already described in FIG. 1. In one embodiment each of the run steps 704-707 is executed by a separate but linked computing device and loading includes loading the process recipe/operational program steps into each of these separate computing devices. In another embodiment a single computing device controls all of the systems and the loading 702 is loading the recipe steps into this single all-controlling computing device. The programs loaded are as described in the previous FIG. 6. The programs loaded include a sequence of programmed steps that are used to age the fluid introduced into the system. Program steps include commands controlling valves and pumps to load and circulate the alcohol containing fluid through a plurality of reaction canisters. In this embodiment the loaded program steps further include control commands for the distribution manifolds (202 FIG. 2) and mixing manifolds (206, FIG. 2). The plurality of circulating systems then each run 704-707 in their parallel cycles. In some cases, the system may include a single pass through reaction canisters and other devices within the system and in other cases the systems may repeatedly circulate through one of the systems until a pre-selected end point is reached. Each of the run steps 704-707 will therefore have its own process and pre-selected endpoint. Once completed the systems stop 708. Stopping includes blending the fluid output from each of the plurality of systems that have completed the run steps 704-707. Recharge decisions 709 are made with those systems requiring recharging proceeding to the recharge process 710 and those that do not require re-charge proceeding back to start 701 as ready for another accelerated aging process.

Figure 8:
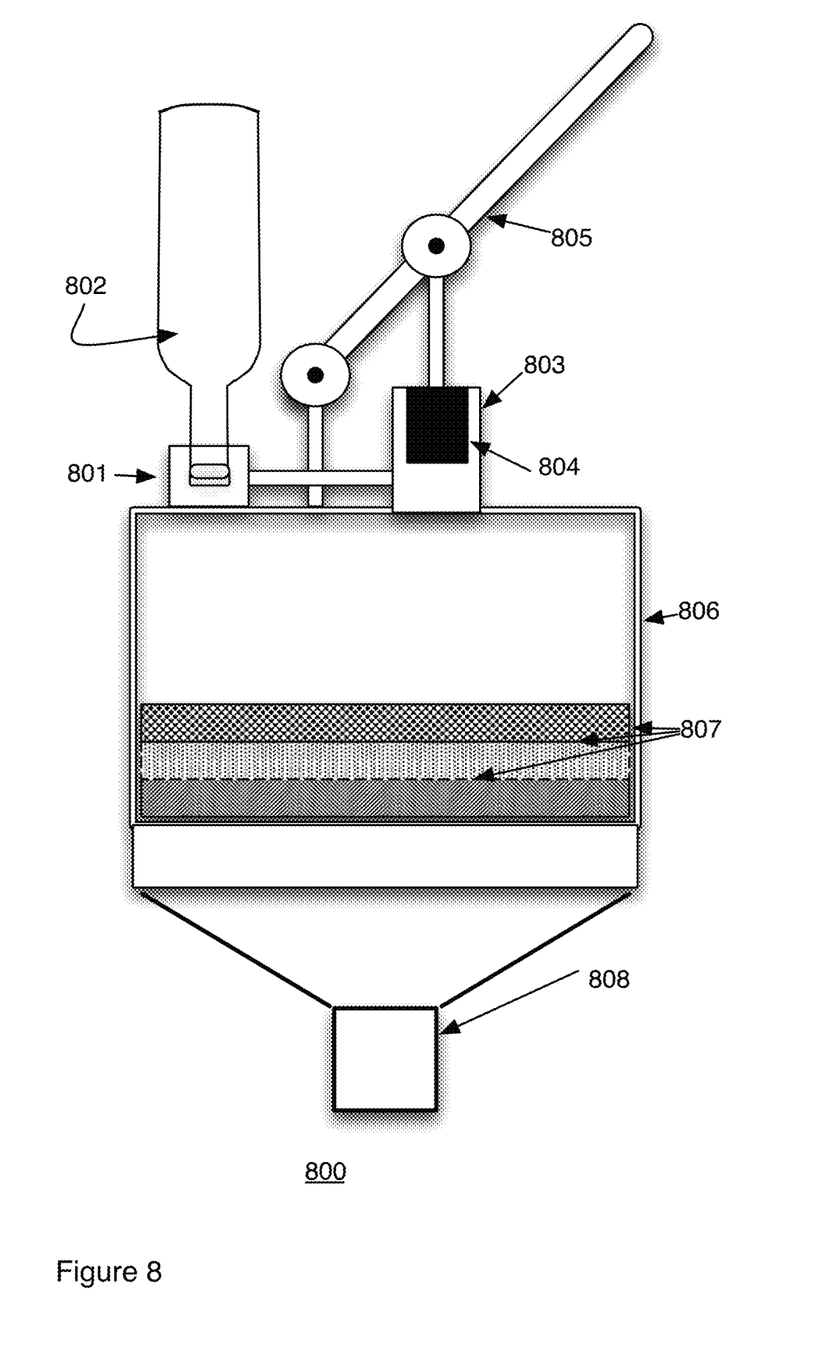
FIG. 8 is a manual version of a device using an infusion/reaction cartridge.

In another physical embodiment, shown in FIG. 8, an accelerated aging system is designed as a single standalone and potentially hand operated system. The accelerated aging system 800 is comprised of an entrance port 801. In one embodiment as shown the entrance port is designed to accept a bottle 802. In this fashion the aging system can be used to process a commercially available bottle of an alcohol containing fluid, such as wine, whiskey, bourbon, gin, vodka, etc. In another embodiment (not shown) the bottle 802 is replaced with a reservoir into which the fluid to be aged is poured. The system is further comprised of a pump 803 that includes a piston 804 and a pump handle that moves the piston up and down within a pump housing (would be labeled same as the pump 803). The pump includes a check valve, not shown, such that fluid is pulled into the pump on one stroke and the fluid is delivered under pressure into a reactor housing 806 on the downstroke. Repeated action of the pump handle pumps fluid out of the input reservoir/bottle 802 and into the reactor housing 806. Inside the reactor housing are a plurality of aging disks 807. The aging disks are as described in FIGS. 1 and 2 and include disks that are cut and in some cases further drilled to allow permeability of the fluid through the disks. The disk may be comprised of oak and other woods that are use in the aging process as well as infused material where the infusate is comprised of materials selected for infusion into the fluid being pumped through the system. Nonlimiting examples include various flavoring materials such as citrus, seeds, spices and beans. The disks in this embodiment include all of the variations of disks described in FIGS. 3-5. In another embodiment the disk and infusates are included in a sealed container shaped and sized to fit the interior of the chamber 806. The infusates and disks may be made of: oak and other woods, ground citrus peels, ground and compressed citrus peels, ground seeds, ground spices and ground beans.

Figure 9:
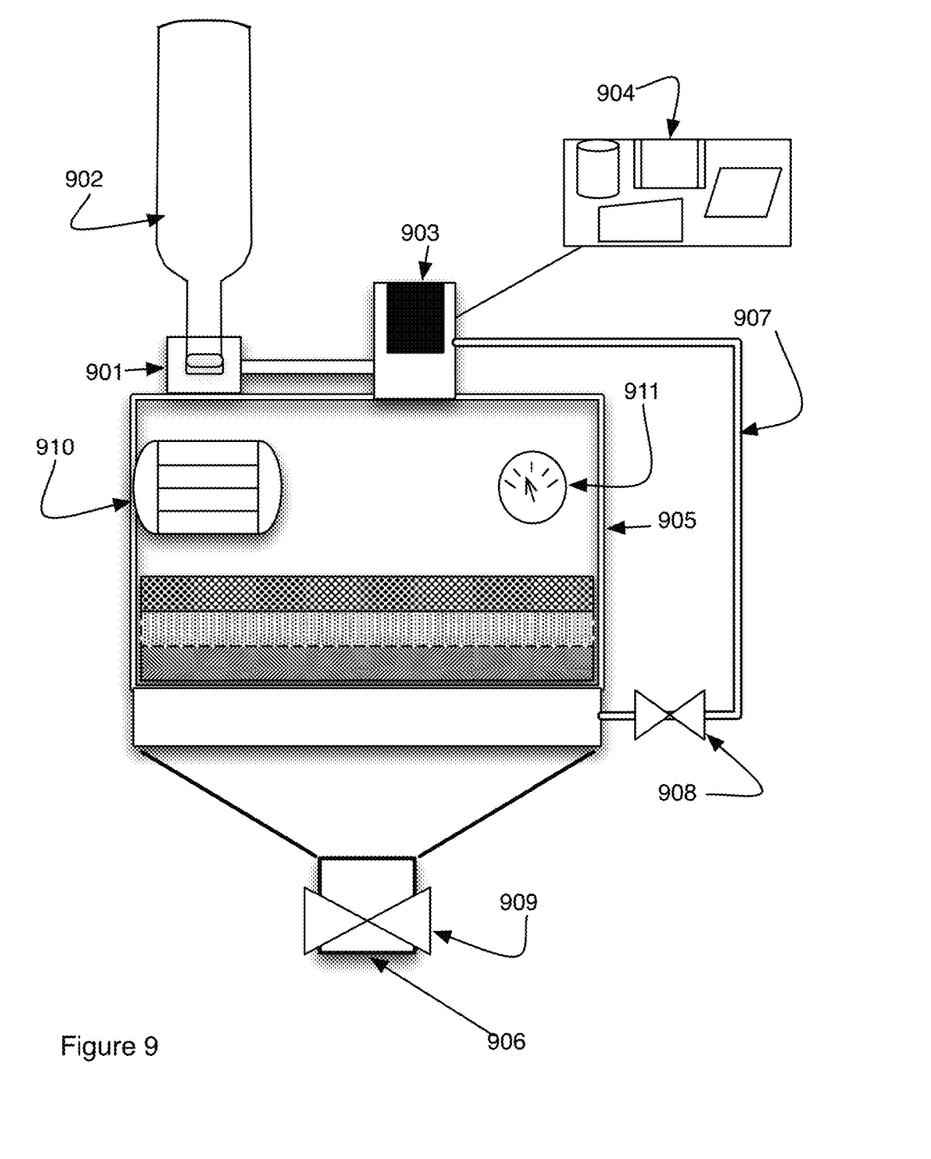
FIG. 9 is an automated embodiment of the device of FIG. 8.

The device further includes an exit port 808. The infused/aged drink is collected at the exit port 808. In another embodiment shown in FIG. 9 the device of FIG. 8 further includes a computing device 904. In this embodiment there is also an entrance port 901. As in FIG. 8 the entrance port 901 may be configured to accept the mouth of a bottle for introduction of drinks to be aged/infused. The entrance port 901 includes a valve and actuator (not shown) that are controlled by the computing device 904. The computing device also controls a pump 903 that pumps fluid from the bottle/input compartment into an infusion chamber 905. The contents of the infusion chamber are as described for the similar chamber of FIG. 8. The computing device is much as the computing device of FIG. 1, having a processor, memory a user interface and an I/O port. A recipe may be loaded into the memory of the computing device; the recipe including program steps to control the input port, pump and valves for recirculation 908 and a valve 909 on the exit port 906. The recipe can include controls for the valves such that the fluid may be pumped into the reaction chamber and re-circulated through the reaction chamber by opening the re-circulation valve 908. The chamber further includes heating and cooling means 910 and sensors 911. Non-limiting sensors include temperature and pressure sensors as well as sensors that measure a property of the fluid to determine completion of the aging/infusion cycle. Once the cycle is complete the valve 909 is opened and the aged/infused fluid is removed. Similar to the device of FIG. 8 the reaction chamber 905 may also be charged with infusate that is in prepackaged units. In another embodiment the prepackaged units include a means to encode the recipe that is read by the I/O port of the computing device 904 when the package is inserted into the chamber 905. Non-limiting exemplary means to encode the recipe include an RFID tag, with an RFID reader connected to the I/O Port, a bar code tag and an optical reader interfaced to the I/O port of the computing device. The recipe in this embodiment include the same types of recipes as included in the more elaborate devices described in FIGS. 6 and 7 limited only by the equipment available in the device of FIG. 9.

Summary

An aging and infusing device for treating fluids used for making alcohol containing drinks is described. In a first embodiment shown in FIGS. 1 and 3 through 5, the device comprises: an entrance port for introduction of the fluid, a reaction canister as described in FIGS. 3-5 and a circulating pump for circulating the fluid through the device. A heater for heating the fluid, a first valve for controlling the entrance of fluid into the device and a second valve for controlling the exit of fluid from the device, a temperature sensor, at least one electronic compositional sensor, the compositional sensor selected from: a pH sensor, a visible light colorimeter, a polarimeter, a near infrared sensor, and, an oxidation-reduction potential probe are all connected to and controlled by a computing device. The device includes plumbing to repeated circulate the fluid through the canister, heater and sensors. The computing device is programmed to open valves to let fluid into the device and open valves to remove fluid when the aging process is complete. The completion is determined by a variety of means including a fixed time and a reading from one of the sensors reaching a preselected point.

The devices and methods that are described enable controlled, repeatable and accelerated aging and infusion of alcohol containing beverages. The devices include newly reaction canisters in a computer controlled environment of valves, pumps, interconnecting plumbing, sensors and mixing and dispersing manifolds. Embodiments include devices and infusing materials. The infusing materials include traditional aging/infusing materials such as oaks traditionally used to make barrels for aging and infusion as well as other woods and a variety of non-wood infusion materials such as citrus, beans and seeds. The combination of controls, sensor and computer interface allows for repeatable preparation of aged/infused drinks and for development of new aged/infused drinks.

Those skilled in the art will appreciate that various adaptations and modifications of the preferred embodiments can be configured without departing from the scope and spirit of the invention.

What is claimed is:

1. An aging and infusing device for treating a fluid that is used to make alcohol containing drinks, said device comprising:
   a) an entrance port for introduction of the fluid into the aging and infusing device,
   b) a reaction canister, the reaction canister having an interior and comprising:
      i) a cylindrical body, having inside and outside walls, and including a reaction canister entrance port and a reaction canister exit port, and, c) the reaction canister containing a plurality of wooden pieces, and,
d) a circulating pump for circulating the fluid through the reaction canister, thereby producing a flow, and,
e) a heater for heating the fluid, and,
f) a first valve for controlling entrance of the fluid into the reaction canister through the reaction canister entrance port, and, a second valve for controlling exit of the fluid from the reaction canister through the reaction canister exit port, and,
g) a temperature sensor that provides electronic temperature data, and,
h) at least one electronic compositional sensor, the compositional sensor selected from: a pH sensor, a visible light colorimeter, a polarimeter, a near infrared sensor, and, an oxidation-reduction potential probe,
i) wherein the first valve, the second valve, the heater, the temperature sensor, the circulating pump, and, the at least one electronic compositional sensor are all interconnected by piping, such that by controlling the first valve, the second valve, and, the circulating pump, the fluid is repeatedly circulated through the reaction canister, the heater, and the at least one compositional sensor, and,
j) wherein the first valve, the second valve, the heater, the temperature sensor, the circulating pump, and the at least one compositional sensor are all electronically connected to and controlled by a computing device, the computing device programmed to:
  i) open the first valve to introduce the fluid into the reaction canister, and,
  ii) start the circulating pump to circulate the fluid through the reaction canister, the heater, the temperature sensor the at least one electronic compositional sensor, and,
  iii) receive the electronic temperature data from the temperature sensor, and, control the temperature of the fluid by turning the heater on and off based upon the electronic temperature data, and,
  iv) receive electronic compositional data from the at least one electronic compositional sensor, and,
  v) open the second valve, to remove the fluid from the reaction canister after either: a preselected time or receiving a preselected electronic data value from the at least one electronic compositional sensor.

2. The aging and infusion device of claim 1 wherein the plurality of wooden pieces are wooden staves that line the inside walls of the reaction canister.

3. The aging and infusion device of claim 1 further including:
a) a central cylindrical shaft located within the reaction canister, the shaft having a diameter and a length, and,
b) interchangeable cylindrical sleeves, the interchangeable cylindrical sleeves having a diameter and a length, the diameter of the interchangeable cylindrical sleeves selected such that the interchangeable cylindrical sleeves removably fit, concentrically, over the shaft thereby creating stops and spacers for items that fit within the reaction canister, and, that are drilled with a hole larger than the diameter of the shaft, but smaller than the diameter of the interchangeable cylindrical sleeves.

4. The aging and infusion device of claim 3, wherein the plurality of wooden pieces include flat wooden disks, each wooden disk having a top surface and a bottom surface, and, each sized and shaped to fit the inside walls of the reaction canister, and, each of the wooden disks including a hole drilled in the center of each disk surface penetrating from the top surface to the bottom surface, the hole sized larger than the diameter of the shaft and smaller than the diameter of the interchangeable cylindrical sleeves, and, the shaft penetrating the hole in the center of each disk, and, the disks separated and held apart from one another by the interchangeable cylindrical sleeves.

5. The aging and infusion device of claim 4, further including a plurality of perforated baskets, the baskets sized and shaped to fit the interior of the reaction canister, and, the baskets including a central hole sized larger than the diameter of the shaft and smaller than the diameter of the interchangeable cylindrical sleeves, and, the plurality of the perforated baskets are removably placed in the reaction canister with their central hole over the central shaft and spaced each from the other by the interchangeable cylindrical sleeves.

6. The aging and infusion device of claim 5, wherein the plurality of wooden pieces include wooden pieces cut into a shape selected from: cubes, staves, trapezoidal blocks, dowels, and orbs.

7. The aging and infusion device of claim 1 further including a porous wooden plug located at the reaction canister exit port, and, positioned such that the fluid passes through the porous wooden plug as it exits the reaction canister.

8. The aging and infusion device of claim 1, further including a cylindrical central shaft, the cylindrical central shaft having a diameter and a length, and, including a plurality of indentations along its length, each of the said indentations acting as support locations for disks placed within the reaction canister, and, the central shaft further including holes along its length, said holes acting as a distribution manifold as the fluid flows through the reaction canister.

9. The aging and infusion device of claim 1, further including an electronic memory device connected to the computing device that can uniquely identify the reaction canister.

10. The aging and infusion device of claim 1, further including at least one item located within the reaction canister the at least one item selected from: the heater, a cooler, and an air infusion disk.

11. The aging and infusion device of claim 1, wherein the at least one electronic compositional sensor is located in the interior of the reaction canister.

12. The aging and infusion device of claim 1, further including a plurality of the reaction canisters, each connected by the tubing to a distribution manifold and a mixing manifold, the distribution manifold including a plurality of valves, and, each valve in the distribution manifold electronically connected to and controlled by the computing device, such that an amount of flow through each of the plurality of reaction canisters is controlled by the computing device.

13. The aging and infusion device of claim 12, wherein the amount of flow through each of the plurality of reaction canisters is set by the computing device based upon a signal from the electronic compositional sensor.

14. The aging and infusion device of claim 1, further including a vacuum pump for controllably reducing an air pressure within the device, thereby removing a controlled amount of volatile compounds from the fluid, said vacuum pump electronically connected to, and turned on and off, by the computing device, and, the vacuum pump is turned on and off by the computing device based upon a signal from the electronic compositional sensor.

15. The aging and infusion device of claim 1 further including an air infuser, said air infuser electronically connected to and controlled by the computing device, and, the air infuser is turned on and off by the computing device based upon a signal from the electronic compositional sensor.

\* \* \* \* \*